United States Patent
Fountain

[19]

[11] Patent Number: 6,058,832
[45] Date of Patent: May 9, 2000

[54] BARBEQUE GRILL

[76] Inventor: Herman Fountain, 2381 Muldrow Rd., Starkville, Miss. 39759

[21] Appl. No.: 09/288,690

[22] Filed: Apr. 9, 1999

[51] Int. Cl.[7] .............................. A47J 37/00; A47J 37/07
[52] U.S. Cl. ................................ 99/446; 99/340; 99/400; 99/448; 99/450; 99/482; 126/25 R; 126/9 R
[58] Field of Search ............................ 99/339, 340, 400, 99/401, 444–450, 481, 482; 126/25 R, 9 R, 41 R, 25 B, 9 B

[56] References Cited

U.S. PATENT DOCUMENTS

| | | |
|---|---|---|
| D. 303,061 | 8/1989 | Fountain, Sr. . |
| 3,561,348 | 2/1971 | Weir, Sr. ................................ 99/446 X |
| 4,362,093 | 12/1982 | Griscom . |
| 4,467,709 | 8/1984 | Anstedt ..................................... 99/482 |
| 4,512,249 | 4/1985 | Mentzel ................................. 126/9 R |
| 4,651,713 | 3/1987 | Ondrasik, II . |
| 4,957,039 | 9/1990 | Reyes ....................................... 99/340 |
| 4,962,696 | 10/1990 | Gillis ..................................... 99/448 X |
| 4,962,697 | 10/1990 | Farrar .................................... 99/446 X |
| 5,086,752 | 2/1992 | Hait . |
| 5,168,796 | 12/1992 | Porton et al. .......................... 126/41 R |
| 5,425,352 | 6/1995 | Gillam et al. .......................... 126/25 R |
| 5,445,073 | 8/1995 | Gilwood ................................. 99/450 X |
| 5,531,154 | 7/1996 | Perez, III ................................. 126/9 R |
| 5,628,242 | 5/1997 | Higley . |
| 5,722,388 | 3/1998 | Butow et al. . |
| 5,768,977 | 6/1998 | Parris et al. ............................... 99/340 |
| 5,862,741 | 1/1999 | Wodeslavsky ........................ 99/446 X |
| 5,910,209 | 6/1999 | Lee .......................................... 99/450 |

FOREIGN PATENT DOCUMENTS

| | | |
|---|---|---|
| 2398971 | 2/1979 | France . |
| 27 16 715 | 10/1977 | Germany . |

*Primary Examiner*—Timothy Simone
*Attorney, Agent, or Firm*—Richard C. Litman

[57] ABSTRACT

A portable barbecue apparatus comprises a hollow base of truncated pyramidal configuration for storing fuel. The hollow base supports a firebox thereon. A cooking grill-oven is disposed above the firebox. A carriage is employed to support the barbecue apparatus. The carriage is pivotally attached to a two-wheeled trailer to permit portability for the barbecue apparatus.

11 Claims, 5 Drawing Sheets

BARBEQUE GRILL

BACKGROUND OF THE INVENTION

1. Field of the Invention

The present invention generally relates to outdoor cooking units. More specifically, the present invention is directed to a portable, outdoor charcoal and/or wood-burning barbecue grill-oven.

2. Description of the Related Art

Outdoor cooking has been a popular entertainment and family diversion in the United States since the mid 1940s. A mega-industry has arisen to provide the outdoor chef with the stoves, ovens, and accessories needed to successfully perform the alfresco cooking operation. In many suburban areas entrepreneurs have employed portable barbecue grills along well traveled roads to provide ready cooked barbecue meats for sale to the busy suburbanite. The portable grills are also used to cater functions at church picnics, family reunions, etc.

The prior art is replete with portable stoves using charcoal and the like for outdoor cooking. For example U.S. Pat. Nos. 4,362,093 (Griscom) and 5,086,752 (Hait) show portable charcoal grills made of sheet metal. Each grill is provided with wheels to facilitate portability. Each grill is also provided with a removable hood so that the grills may be adapted to various types of outdoor cooking.

U.S. Pat. No. 5,628,242 (Higley) shows a portable hooded barbecue grill adapted to use gaseous fuel.

U.S. Pat. No. 5,722,388 (Butow et al.) and German Patent 2,716,715 disclose barbecue grills having a tapering chimney for directing hot gases to the cooking area.

French Patent 2,398,971 shows a barbecue grill with an open fuel storage space.

U.S. Pat. No. 4,651,713 (Ondrasik, II) is directed to slide out racks for ovens.

None of the above inventions and patents, taken either singularly or in combination, is seen to disclose a barbecue grill having a closed fuel storage space, drain cleaning duct, and unique transporting means as will be described and claimed in the instant invention.

SUMMARY OF THE INVENTION

The instant invention is an improvement of the barbecue grill disclosed in U.S. Pat. No. Des. 303,061 (Fountain, Sr.) and is directed to a portable barbecue grill which incorporates a closed area for storing charcoal fuel and the like. The grill of the instant invention comprises an optionally closed three level cooking enclosure designed to promote fuel efficiency. The use of sliding racks in the enclosure facilitates access to the food being cooked. A drainage duct exits the enclosure from a lower portion thereof so that the enclosure may be conveniently hosed down and cleaned.

The grill is pivotally mounted on a wheeled trailer for transport. The trailer is provided with a hitch for easy attachment to a towing vehicle.

Accordingly, it is a principal object of the invention to provide an outdoor barbecue grill which is fuel efficient.

It is another object of the invention to provide an outdoor barbecue grill which is easily cleaned.

It is a further object of the invention to provide an outdoor barbecue grill which incorporates a closed fuel storage area.

Still another object of the invention is to provide an outdoor barbecue grill which is portably mounted to a wheeled vehicle for easy transport.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
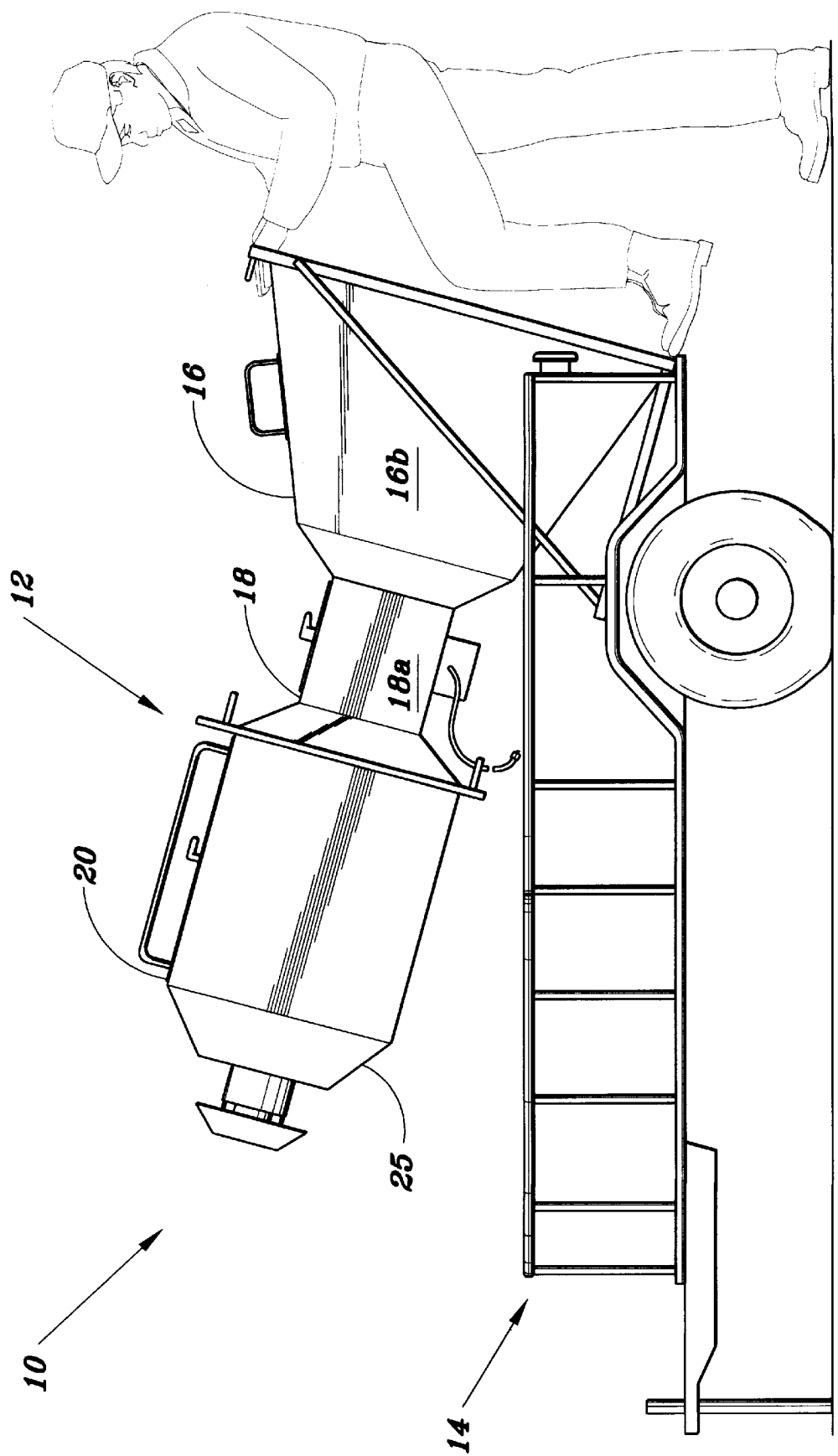
FIG. 1 is an environmental view of a barbeque grill and trailer according to the present invention.
Figure 2:
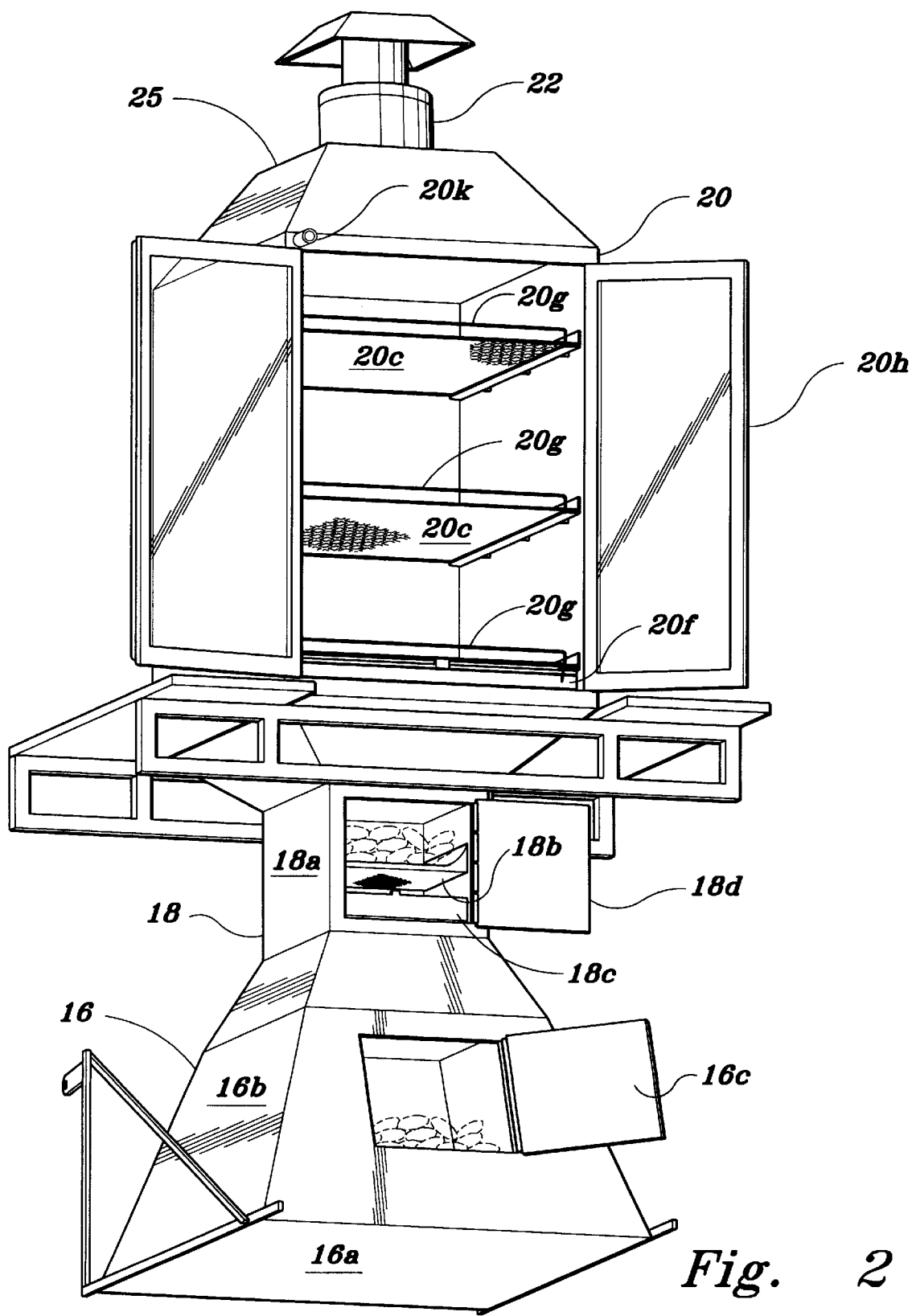
FIG. 2 is a perspective view of the barbecue grill opened to show the cooking enclosure, firebox, and fuel storage area.
Figure 3:
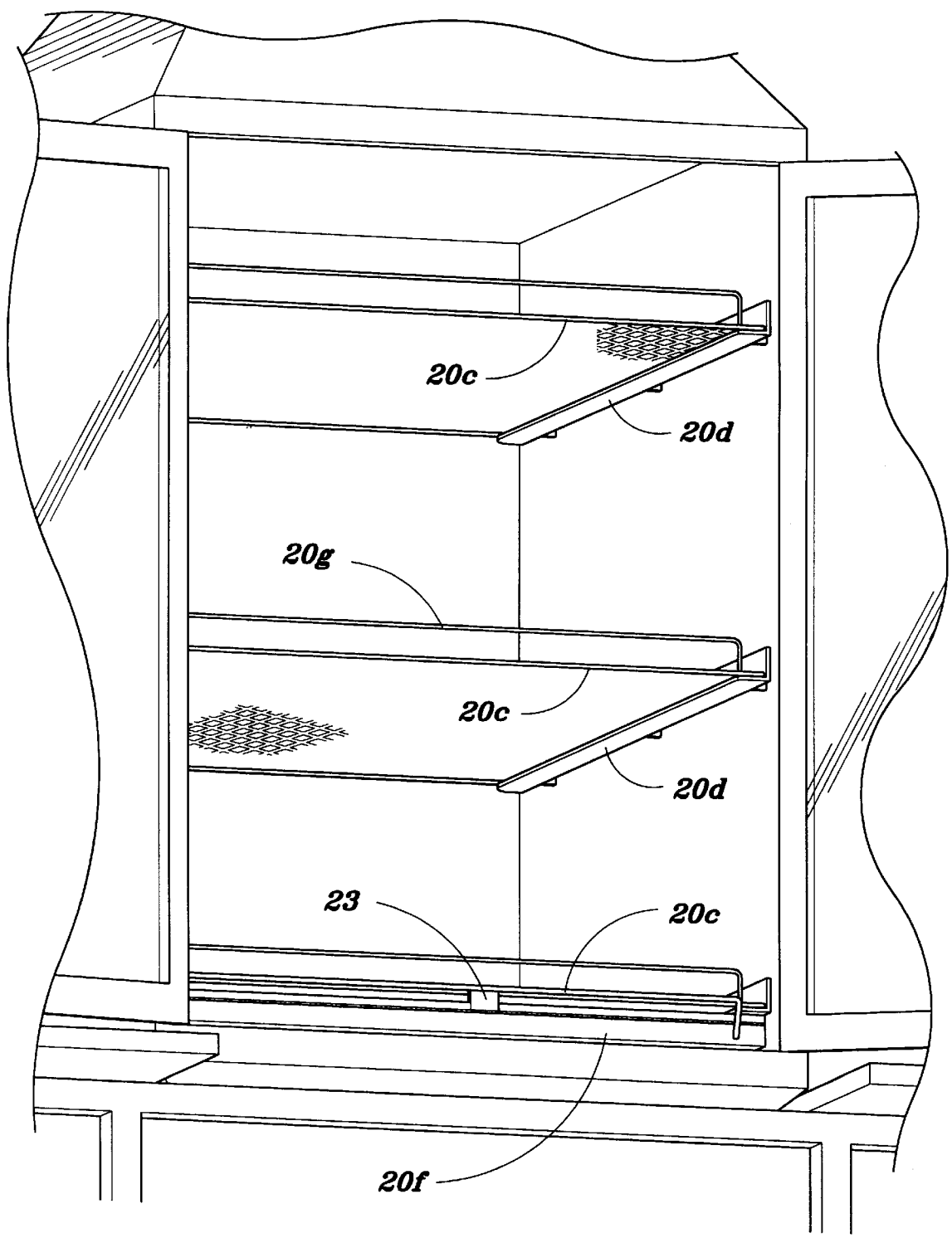
FIG. 3 is a partial perspective view to show the pullout rack structure.

The portable barbecue apparatus of the present invention as illustrated in FIG. 1 is generally designated at 10. The apparatus 10 comprises a barbecue grill 12 which is mounted to a trailer 14 in a manner such that the grill 12 may be either deployed in an upright position for use or pivoted to a horizontal position on the trailer 14 for transport. Grill 12 comprises base 16, firebox 18, and oven 20.

Figure 4:
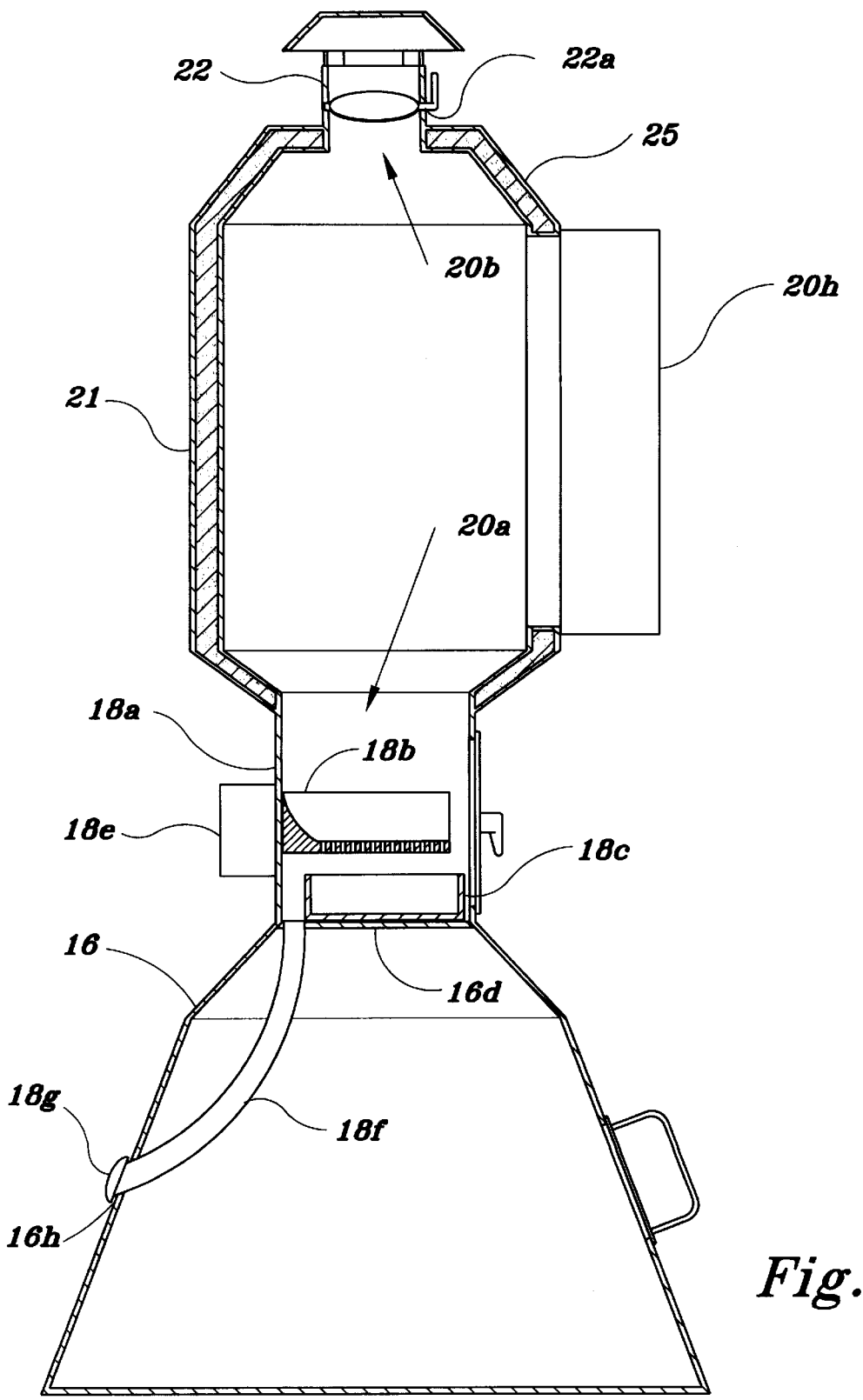
FIG. 4 is sectional view of the barbecue grill which shows the drainage duct and damper opening.

As best illustrated in FIGS. 1–4, base 16 comprises a bottom wall 16a, and front, rear, and side walls 16b. Base 16 is closed at its top by wall 16d (FIG. 4). Base 16 is configured as a truncated pyramid. The walls of base 16 define a hollow interior which is utilized to store fuel (charcoal, wood). A door 16c provides access to the hollow interior. Base 16 is fabricated from metal stock of suitable gauge and durability to provide proper support for the firebox 18 and oven 20.

Firebox 18 is positioned above base 16 and is integral therewith. Walls 18a of firebox 18 define a hollow interior containing a fuel grate 18b and ash pan 18c. Ash pan 18c is supported below grate 18b on the top wall 16d of base 16. Fuel grate 18b and ash pan 18c function in a conventional manner. Firebox 18 is integral with and fabricated from the same metal as section 16 and is provided with a door 18d for access thereto.

Oven 20 is a double walled enclosure having openings 20a and 20b respectively in fluid communication with firebox 18 and a flue 22. Oven 20 is provided with tiered cooking racks 20c which are slidably mounted on supports 20d. A drip pan 20f is positioned beneath the lowermost cooking rack. An upstanding lip 23 is attached to the front edge of drip pan 20f and extends above the front edge of the lowermost cooking rack 20c. This arrangement allows the drip pan and the lowermost rack to be simultaneously partially withdrawn from the oven so that the drip pan can catch drippings from the upper racks when they are partially withdrawn. The oven 20 is fabricated from sheet metal of suitable gauge as determined by one skilled in the art. Insulation 21 (FIG. 4) is sandwiched by the walls of the oven in conventional manner so that the oven 20 will retain heat. The cooking racks 20c are made of expanded metal. Racks 20c and drip pan 20f are provided with handles 20g to facilitate movement to and from the oven. Hinged doors 20h secured to the front of oven 20 so as to close the oven for smoking food, if desired. Doors 20h are provided with three-sixteenths of an inch thick non-tempered glass panels so that the cooking operation may be observed when the doors are closed. Doors 20h may be equipped with suitable locking means, if desired. The oven 20 may also be equipped with a one hundred watt light fixture to provide illumination for cooking at night. A temperature gauge 20k is positioned above the left door so that the oven temperature can be monitored. The top 25 of the oven 20 is configured as a truncated pyramid having the opening 20b therein to receive flue 22.

Attention is now directed specifically to FIG. 4 which shows the oven 20, fire box 18, and base 16 in section. A conventional adjustable damper 18e is disposed on the rear of fire box 18 to control the draft to the fuel grate 18b. An adjustable damper 22a is also provided in flue 22 for "fine tuning" the air flow through oven 20. A duct 18f opens into the bottom of fire box 18 and exits at 16h on the rear of section 16. Duct 18f functions as a drain so that the oven and fire box can be hosed down for thorough cleaning. Duct 18f is selectively closed by a cap 18g.

Figure 5:
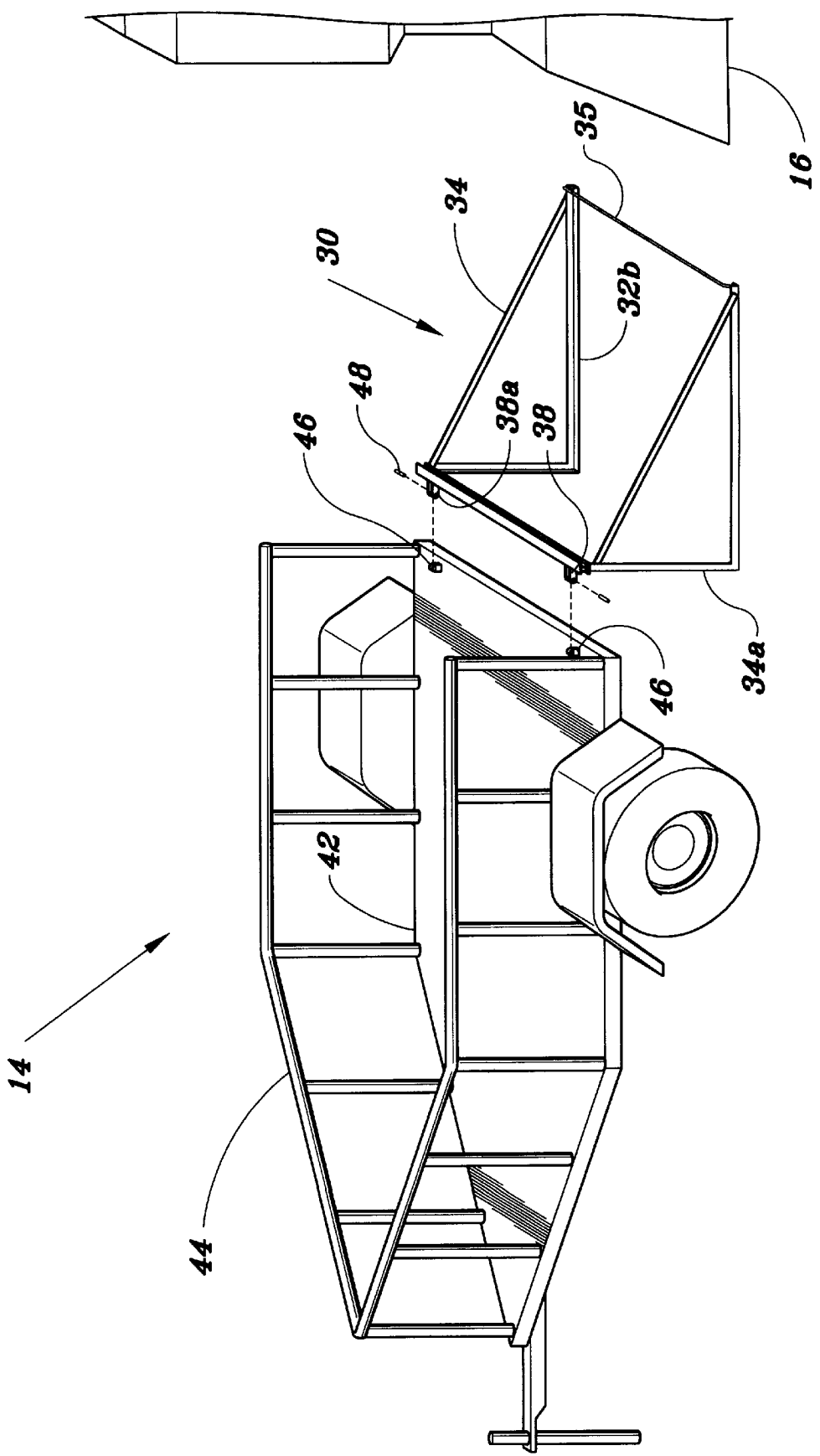
FIG. 5 is a perspective, exploded view of the barbecue grill and trailer.

A carriage structure 30 for supporting the grill is best seen in FIG. 5. Carriage 30 comprises a pair of spaced-apart reinforced angle irons 32 and 34. Each angle iron 32, 34 has respective vertical legs 32a, 34a and horizontal legs 32b, 34b. Vertical legs 32a, 34a are bridged by and welded to an I-beam 36. Horizontal legs 32b, 34b are bridged by and welded to a metal bar 35. The area defined by the angle irons 32, 34, I-beam 36, and metal bar 35 is sized to receive base 16 of the grill therein. Base 16 is provided with conventional lugs (not shown) so that the base may be bolted to the angle irons for transport. Each end of I-beam 36 is provided with a U-shaped pivot plate 38 welded thereto. Each pivot plate 38 has coaxial holes 38a bored therein.

A two-wheeled trailer generally indicated at 14 is adapted to support and transport the grill apparatus. Trailer 14 includes a flat bed 42 having its perimeter defined by a framework 44 made of iron rods. Although pentagonally configured, trailer 14 may be designed in any convenient shape if it is of a size to contain the grill apparatus. A pair of pivot joints 46, having axial bores therethrough, are spaced apart and securely attached to bed 42. The pivot joints 46 are spaced so that each joint will be sandwiched by a respective pivot plate 38. The coaxial holes 38a of the respective pivot plates are aligned with the axial bores of the pivot joints 46. Pivot pins 48 are inserted into the aligned structure achieving pivotal attachment of carriage 30 with trailer 14, thus enabling the grill supported in carriage 30 to be pivotally moved from and onto the trailer (FIG. 1). A gate (not shown) may be used to close the rear of the trailer, if desired.

It is to be understood that the present invention is not limited to the embodiment described above, but encompasses any and all embodiments within the scope of the following claims.

I claim:

1. A portable barbecue grill comprising:
   a base, said base having a front wall, a rear wall, side walls, a bottom wall, and a top wall completely enclosing a hollow interior, said base configured as a truncated pyramid;
   a firebox, said firebox having an interior defined by a rectangular vertically-oriented front wall, a rectangular vertically-oriented rear wall, rectangular vertically-oriented side walls, a rectangular horizontally-oriented bottom wall, and an open top, said firebox disposed upon said base such that the top wall of said base is the bottom wall of said firebox; and
   a cooking chamber, said cooking chamber positioned upon said firebox and having an open bottom in fluid communication with said open top of said firebox, said cooking chamber defined by a vertically extending front wall, a vertically extending rear wall, vertically extending side walls, and a top wall configured as a truncated pyramid.

2. The portable barbecue grill as defined in claim 1, wherein the front wall of said base, the front wall of said firebox, and the front wall of said cooking chamber each have an access formed therein and wherein means are provided to selectively open or close each said access.

3. The portable barbecue grill as defined in claim 1, wherein an ash pan is disposed on said bottom wall of said firebox and a fuel grate is positioned in said firebox above said ash pan.

4. The portable barbecue grill as defined in claim 3, wherein an adjustable damper is disposed on an exterior portion of said rear wall of said firebox, which damper is in fluid communication with said firebox and ambient air.

5. The portable barbecue grill as defined in claim 1, wherein vertically spaced support means are attached to the vertically extending side walls of said cooking chamber and cooking racks are spaced vertically on said support means for sliding movement thereon.

6. The portable barbecue grill as defined in claim 5, wherein a drip pan is disposed beneath a lowermost cooking rack of the vertically spaced cooking racks, said drip pan having a front end, means on said front end in abutment with said lowermost cooking rack whereby said lowermost cooking rack and said drip pan can be moved simultaneously.

7. A barbecue grill as defined in claim 6, wherein the top wall of said cooking chamber has an opening therein;
   there being a damper controlled flue disposed through said opening in fluid communication with said cooking chamber.

8. The portable barbecue grill as defined in claim 1 including a drainage conduit, said conduit having a first end in fluid communication with the interior of said firebox, said conduit having a second end which exits the grill via the rear wall of said base.

9. The portable barbecue grill as defined in claim 8, wherein a removable cap is disposed on said second end of the conduit.

10. A portable barbecue grill comprising:
   a base, said base having a front wall, side walls, a bottom wall, and a top wall completely enclosing a hollow interior, said base configured as a truncated pyramid;
   a firebox, said firebox having an interior defined by a rectangular vertically-oriented front wall, a rectangular vertically-oriented rear wall, rectangular vertically-oriented side walls, a rectangular horizontally-oriented bottom wall, and an open top, said firebox disposed upon said base such that the top wall of said base is the bottom wall of said firebox;

a cooking chamber, said cooking chamber positioned upon said firebox and having an open bottom in fluid communication with said open top of said firebox, said cooking chamber defined by a vertically extending front wall, a vertically extending rear wall, vertically extending side walls, and a top wall configured as truncated pyramid;

a two-wheeled flatbed trailer; and means for pivotally mounting said barbecue grill to said trailer.

11. The portable barbecue grill as defined in claim 10, wherein said means for pivotally attaching includes a carriage supporting said grill thereon, said carriage comprising a pair of spaced-apart angle irons, each angle iron having a first end and a second end;

an I-beam bridging the space between said angle irons and rigidly attached thereto at each first end;

a metal bar bridging the space between said angle irons and rigidly attached thereto at each said second end;

a pair of U-shaped pivot plates fixed on said I-beam;

a pair of pivot joints fixed on said flatbed trailer; and a pair of pins pivotally connecting said pivot plates to said pivot joints.

* * * * *